Figure 1:
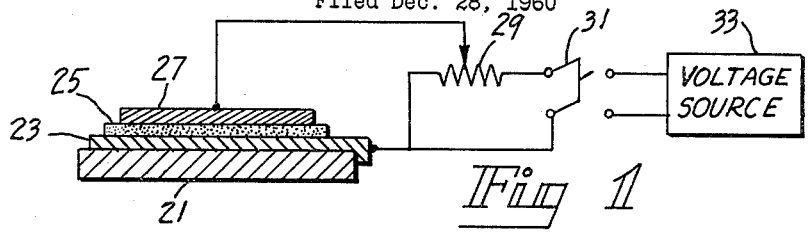

United States Patent Office 3,071,708
Patented Jan. 1, 1963

3,071,708
ELECTROLUMINESCENT SCREEN
Joseph Paul Stanavage, Lancaster, Pa., assignor to Radio Corporation of America, a corporation of Delaware
Filed Dec. 28, 1960, Ser. No. 79,005
15 Claims. (Cl. 313—108)

This invention relates to electroluminescent screens which emit white light upon excitation by alternating electric fields.

One type of electroluminescent screen comprises a pair of opposed electrodes spaced by a layer consisting essentially of finely divided electroluminescent phosphor particles in an electrically insulating medium. When an electric field is produced across the layer between the electrodes, the phosphor particles emit light, which is referred to as electroluminescence. The color, brightness, and other characteristics of the emitted light are principally dependent upon the composition and structure of the phosphor particles.

It is known that white electroluminescence can be produced in such screens using a mixture of blue-emitting and yellow-emitting electroluminescent phosphors that are suitably matched to each other and are in the proper proportions. For such white-emitting screens, the two phosphors must be balanced for brightness and color of electroluminescence for the field strengths and frequencies of the excitating field. Further, the ratio of brightness between the component phosphors desirably should remain substantially constant during the life of the screen so that the overall emission color of the screen does not change to blue or to yellow. This characteristic is referred to as color stability.

An object of this invention is to provide an improved electroluminescent screen comprising a mixture of blue-emitting and yellow-emitting phosphor particles, in which the phosphors are balanced for brightness and color of electroluminescence for the field strengths and frequencies of excitation.

Another object is to provide a white-emitting electroluminescent screen whose emission color remains substantially constant during the life of the screen.

A white-emitting electroluminescent screen, according to the invention, which achieves the foregoing objects consists essentially of particular proportions of blue-emitting and yellow-emitting prosphors, which phosphors are selected from specific compositional ranges. Specifically, an electroluminescent screen of the invention consists essentially of 30 to 70 weight percent of a blue-emitting phosphor having the composition

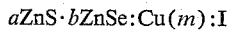

wherein $a = 0.85$ to $1.0$ mol
$b = 0.15$ to $0.0$ mol
$a + b = 1.0$ mol
$m = 0.15$ to $0.35$ weight percent and 70 to 30 weight percent of a yellow-emitting phosphor having the composition

wherein $c = 0.44$ to $0.78$ mol
$d = 0.56$ to $0.22$ mol
$c + d = 1.0$ mol
$n = 0.15$ to $0.35$ weight percent
$p = 0.5$ to $3.0$ weight percent In addition to achieving the objects of the invention through a proper balance of emission color and emission brightness, and which balance prevails for a long life, the phosphors herein are chemically stable and compatible, which permits their combination in practical devices. Further, the electroluminescence of the screen may be provided in the desired color of white by the adjustment of the proportions of the respective phosphors as taught herein.

Figure 2:
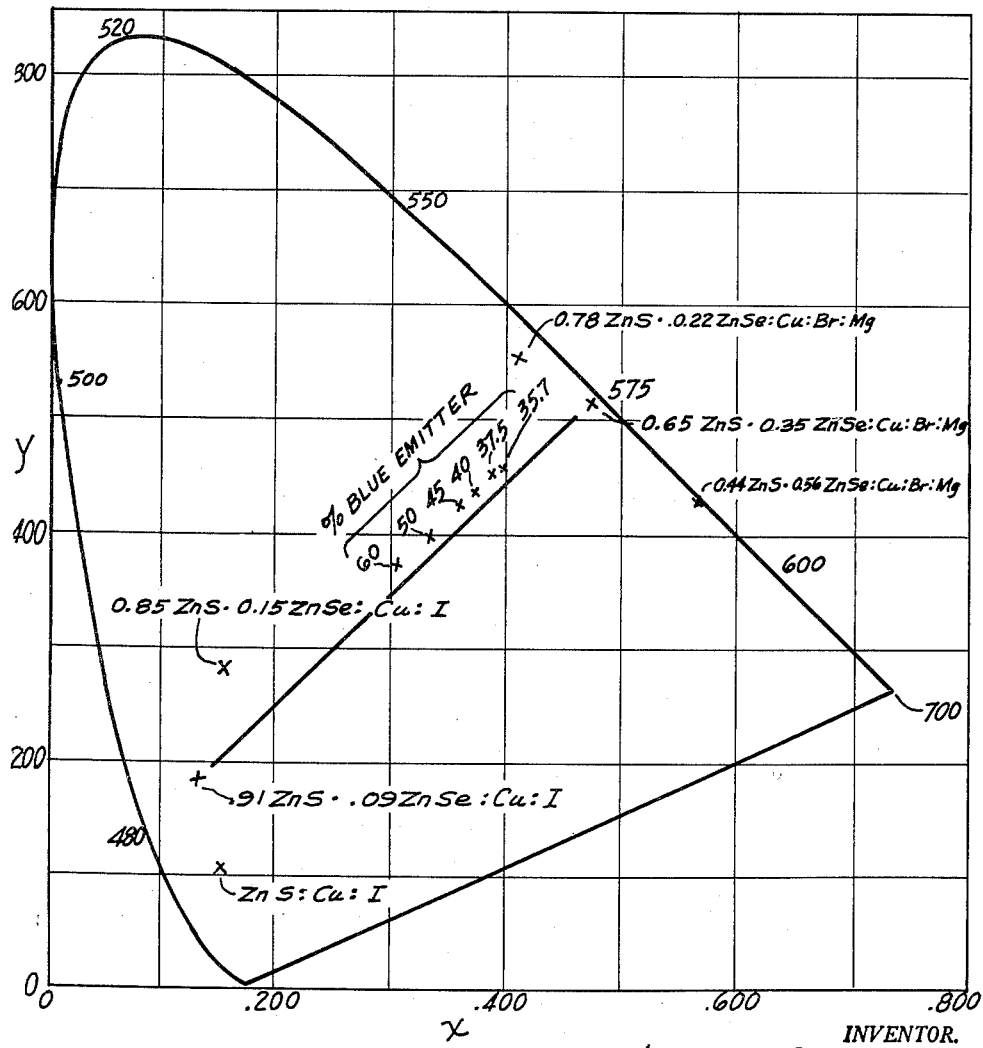

The invention is described below in more detail with reference to the accompanying drawing in which:

FIGURE 1 is a partially-sectional, partially-schematic view of an apparatus incorporating an electroluminescent screen of the invention and FIGURE 2 is a C.I.E. diagram illustrating the ranges of spectral emission of blue and yellow emitting phosphors which may be blended to obtain white-emitting screens of the invention.

*Example.*—FIGURE 1 illustrates a device which incorporates a screen of the invention. The device comprises a transparent sheet support 21, such as glass, which serves as a support for the additional structure of the device. A transparent electrically conducting layer 23 is supported on one surface of the support 21. The transparent conducting layer 23 may be a tin chloride treated glass surface. An electroluminescent phosphor layer 25 is supported upon the transparent conducting layer 23. The phosphor layer consists essentially of 40 weight percent of blue-emitting phosphor particles having the molar formula $0.91\text{ZnS} \cdot 0.09\text{ZnSe}:\text{Cu}(.25):\text{I}$, and 60 weight percent of yellow-emitting phosphor particles having the molar composition

The numbers in parentheses are weight percent with respect to the weight of the host crystal. The phosphor particles are bonded with about 35 weight percent with respect to the total weight of phosphor particles of an epoxy resin binder. An electrically conducting layer 27, such as evaporated aluminum metal, is supported on the phosphor layer 25. Thus, the device comprises a pair of opposed electrodes 23 and 27 spaced by a layer 25 of phosphor particles in a solid electrically-insulating binder. The support 21 and the adjacent, electrically conducting layer 23 are transparent so that light emitted in the phosphor layer 25 may be transmitted therethrough.

The electrodes 23 and 27 are connected to a voltage source 33 through a switch 31 and a potentiometer 29. A voltage, for example, 200 volts at 420 cycles per second, is applied across the electrodes 23 and 27 by closing the switch 31 and adjusting the potentiometer 29. White light is observed through the support 21.

THE BLUE-EMITTING PHOSPHOR

The blue-emitting phosphor has the composition

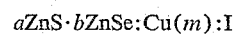

wherein:

$a = 0.85$ to $1.0$ mol
$b = 0.15$ to $0.0$ mol
$a + b = 1.0$ mol
$m = 0.15$ to $0.35$ weight percent Weight percents are with respect to the weight of host crystal: ZnS plus ZnSe. The preferred ratio of $a/b$ is 91/9. This phosphor has C.I.E. coordinates of $x = 0.137$ and $y = 0.183$ at 420 c.p.s. This point is located on the C.I.E. diagram of FIGURE 2. Increasing this ratio shifts the emission color towards ultraviolet, while decreasing the ratio shifts the emission color towards green. The emission colors of the following blue-emitting phosphors are also indicated on the C.I.E. diagram of FIGURE 2: $0.85\text{ZnS} \cdot 0.15\text{ZnSe}:\text{Cu}(0.25):\text{I}$ and $\text{ZnS}:\text{Cu}:\text{I}$. The proportion of copper may be varied within the limits indicated. The preferred proportion, which is about 0.25 weight percent, gives the brightest phosphor.

Iodine atoms are incorporated into the host crystal and function as charge compensators for the incorporated copper atoms. Other halogens are not substituted for iodine, since they shift the emission color toward the green and also produce less saturated emission colors.

The blue-emitting phosphor may be prepared by any of several different processes. For example, the preferred blue-emitting phosphor may be prepared by first intimately mixing 0.91 mol ZnS, 0.09 mol ZnSe, 0.25 weight percent copper as copper iodide and 2 weight percent of ammonium iodide. The mixture is then heated at about 1100° C. for about 30 minutes in a non-reactive atmosphere, such as nitrogen. Upon cooling, the reaction product is ready for use as a phosphor. A preferred process comprises first intimately mixing 0.4 mol ZnO, 7.0 mol ZnS, 0.7 mol Se, 0.25 weight percent copper as copper acetate and 1.14 weight percent ammonium iodide. Then, the mixture is heated at about 700° C. for about 15 minutes, then the temperature is raised to about 1075° C. and held at that temperature for about 45 minutes in a completely filled container which is closed to the atmosphere. During the heating, the constituents react to produce particles of the desired phosphor composition. Volatile products, including $SO_2$ are removed. Upon cooling, the reaction product is ready for use as a phosphor.

THE YELLOW-EMITTING PHOSPHOR

The yellow-emitting phosphor has the composition $$cZnS \cdot dZnSe:Cu(n):Br:Mg(p)$$

wherein:

$c = 0.44$ to $0.78$ mol
$d = 0.56$ to $0.22$ mol
$c + d = 1.0$ mol
$n = 0.15$ to $0.35$ weight percent
$p = 0.5$ to $3.0$ weight percent Weight percents are with respect to the weight of host crystal: ZnS plus ZnSe. The preferred ratio of $c/d$ is 65/35. This phosphor has C.I.E. coordinates of $x = 0.470$ and $y = 0.517$ at 420 c.p.s. This point is located on the C.I.E. diagram of FIGURE 2. Increasing this ratio shifts the emission color towards green, while decreasing the ratio shifts the emission toward orange. The emission color of the following yellow emitting phosphors are also indicated on the C.I.E. diagram of FIGURE 2:

$$0.78ZnS \cdot 0.22ZnSe:Cu(0.25):Br:Mg(1.2)$$

and $$0.44ZnS \cdot 0.22ZnSe:Cu(0.25):Br:Mg(1.2)$$

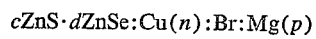

The proportion of copper may be varied within the limits indicated. The preferred proportion, which is about 0.25 weight percent, gives the brightest phosphor.

Bromine atoms are incorporated into the host crystal and function as charge compensators for the incorporated copper atoms. Other halogens are not substituted for bromine.

The magnesium is an important constituent of the yellow-emitting phosphor. The proportion of the magnesium present determines the brightness and the life of the yellow-emitting phosphor. Life is the measure of the rate of depreciation of the brightness of a phosphor with respect to the time of operation compared to the initial brightness. With the preferred proportion of magnesium, the yellow-emitter has about the same life as the blue-emitting phosphor. As the proportion of magnesium in the phosphor is decreased, the brightness is decreased and the life is lengthened. Correspondingly, when the proportion of magnesium in the phosphor is increased, the brightness is increased and the life is shortened. To obtain color stability, it is necessary that the component phosphors depreciate in brightness at about the same rates; that is, the component phosphors have about the same lives.

The yellow-emitting phosphor may be prepared by the same methods as the blue-emitting phosphor, except that the ingredients and the proportions of the ingredient are different. The preferred method for preparing the preferred yellow-emitting phosphor includes first intimately mixing 0.8 mol ZnO, 2.3 mol ZnS, 1.4 mol Se, 0.25 weight percent copper, as copper bromide and 1.2 weight percent Mg, as MgO. The mixture is heated at about 700° C. for about 15 minutes then the temperature is raised to 1075° C. and held at that temperature for about 45 minutes in a completely filled and covered container and then cooled. During heating the constituents react to produce particles of the desired phosphor composition. Volatile products, including $SO_2$, are removed. Upon cooling, the reaction product is ready for use as a phosphor.

THE WHITE-EMITTING ELECTROLUMINESCENT SCREEN

The white-emitting screens of the invention comprise a physical mixture of particles of one of the foregoing blue-emitting phosphors and one of the foregoing yellow-emitting phosphors. Particles of the two phosphors may be mixed in any proportion. However, proportions between 30 and 70 weight percent blue-emitter and between 70 and 30 weight percent yellow-emitter have been found to produce desirable whites. In fact, the precise color of white may be determined by the proportion of blue-emitter to yellow-emitter. The following table indicates the proportions of the preferred blue-emitter and yellow-emitter which yield screens of different whites (in ° K.).

Table

| Percent Blue-Emitter | Percent Yellow-Emitter | Screen Color in ° K. | MPCD [1] |
|---|---|---|---|
| 35.7 | 64.3 | 4,070 | +81 |
| 37.5 | 62.5 | 4,230 | +76 |
| 40.0 | 60.0 | 4,410 | +75 |
| 45.0 | 55.0 | 4,800 | +69 |
| 50.0 | 50.0 | 5,540 | +67 |
| 60.0 | 40.0 | 6,700 | +63 |

[1] MPCD (minimum perceptible color difference).

A white-emitter can be defined by color as well as C.I.E. points. The screen color in ° K. represents its location on or parallel to the line depicting black body radiation. This will vary from red through blue as screen temperature increases. MPCD's represent the change in color as the location moves perpendicular to the black body line. Generally, increasing negative values indicate an approach toward purple; increasing positive values a shift toward the green.

The color of each of the screens in the table are indicated by points on the C.I.E. diagram of FIGURE 2 indicated by the percent blue emitter. A straight line has been drawn between the point indicating the component phosphors. It will be noted that the points for the screens lie slightly above this line. It is believed that this results from the absorption of some of the blue-emission by the yellow emitting phosphor.

If the blue-emitter has a higher ratio of $a/b$ than 91/9, then the yellow-emitter should be selected with a ratio of $c/d$ lower than 65/35 to obtain the same white. The converse is also true.

The phosphors of the screen are preferably in a dielectric medium which may be liquid, semisolid or solid. Some suitable liquids are castor oil and silicone oil. The phosphors are preferrably bound in a solid or semisolid such as a wax, plastic, resin, or glass; and may be present in proportions between 20 and 50% (preferably 35%) by weight of the phosphors.

The screen may be fabricated by coating a slurry including the phosphor particles and the binder upon a suitable support. Some processes which may be used are doctor-blading of flow-coating. Spraying the slurry is the preferred method of fabricating the screens.

The remaining structures of an electroluminescent device including a screen of the invention may be any of the structures conventionally used. Similarly, the means for exciting the screen may be any of the means conventionally used for this purpose.

What is claimed is:

1. An electroluminescent screen consisting essentially of a mixture of 30 to 70 weight percent of a blue-emitting phosphor having the composition $$a\text{ZnS} \cdot b\text{ZnSe:Cu}(m):\text{I}$$

wherein
$a = 0.85$ to $1.0$ mol
$b = 0.15$ to $0.00$ mol
$a + b = 1.0$ mol
$m = 0.15$ to $0.35$ weight percent and 70 to 30 weight percent of a yellow-emitting phosphor having the composition $$c\text{ZnS} \cdot d\text{ZnSe:Cu}(n):\text{Br:Mg}(p)$$

wherein
$c = 0.44$ to $0.78$ mol
$d = .56$ to $.22$ mol
$c + d = 1.0$ mol
$n = 0.15$ to $0.35$ weight percent
$p = 0.5$ to $3.0$ weight percent.

2. An electroluminescent screen consisting essentially of a mixture of 30 to 70 weight percent of a blue-emitting phosphor having the composition $$0.91\text{ZnS} \cdot 0.09\text{ZnSe:Cu}(0.25):\text{I}$$

and 70 to 30 weight percent of a yellow-emitting phosphor having the composition $$0.65\text{ZnS} \cdot 0.35\text{ZnSe:Cu}(0.25):\text{Br:Mg}(1.2)$$

3. An electroluminescent screen consisting essentially of a mixture of about 40 weight percent of a blue-emitting phosphor having the composition $$0.91\text{ZnS} \cdot 0.09\text{ZnSe:Cu}(0.25):\text{I}$$

and about 60 weight percent of a yellow-emitting phosphor having the composition $$0.65\text{ZnS} \cdot 0.35\text{ZnSe:Cu}(0.25):\text{Br:Mg}(1.2)$$

4. An electroluminescent screen adapted to emit white light upon excitation by an alternating electric field comprising a layer of finely-divided phosphor particles and means for applying said electric field thereto, said layer consisting essentially of a mixture of 30 to 70 weight percent of a blue-emitting phosphor having the composition $$a\text{ZnS} \cdot b\text{ZnSe:Cu}(m):\text{I}$$

wherein
$a = 0.85$ to $1.0$ mol
$b = 0.15$ to $0.0$ mol
$a + b = 1.0$ mol
$m = 0.15$ to $0.35$ weight percent and 70 to 30 weight percent a yellow-emitting phosphor having the composition $$c\text{ZnS} \cdot d\text{ZnSe:Cu}(n):\text{Br:Mg}(p)$$

wherein
$c = 0.44$ to $0.78$ mol
$d = 0.56$ to $0.22$ mol
$c + d = 1.0$ mol
$n = 0.15$ to $0.35$ weight percent
$p = 0.5$ to $3.0$ weight percent.

5. An electroluminescent screen adapted to emit white light upon excitation by an alternating electric field comprising a layer of finely-divided phosphor particles and means for applying said electric field thereto, said layer consisting essentially of a mixture of 30 to 70 weight percent of a blue-emitting phosphor having the composition $0.91\text{ZnS} \cdot 0.09\text{ZnSe:Cu}(0.25):\text{I}$; and 70 to 30 weight percent of a yellow-emitting phosphor having the composition $0.65\text{ZnS} \cdot 0.35\text{ZnSe:Cu}(0.25):\text{Br:Mg}(1.2)$.

6. An electroluminescent screen adapted to emit white light upon excitation by an alternating electric field comprising a pair of opposed electrodes spaced by a layer of finely-divided phosphor particles in an insulating medium, said layer consisting essentially of a mixture of 30 to 70 weight percent of a blue-emitting phosphor having the composition $$a\text{ZnS} \cdot b\text{ZnSe:Cu}(m):\text{I}$$

wherein
$a = 0.85$ to $1.0$ mol
$b = 0.15$ to $0.0$ mol
$a + b = 1.0$ mol
$m = 0.15$ to $0.35$ weight percent and 70 to 30 weight percent a yellow-emitting phosphor having the composition $$c\text{ZnS} \cdot d\text{ZnSe:Cu}(n):\text{Br:Mg}(p)$$

wherein
$c = 0.44$ to $0.78$ mol
$d = 0.56$ to $0.22$ mol
$c + d = 1.0$ mol
$n = 0.15$ to $0.35$ weight percent
$p = 0.5$ to $3.0$ weight percent.

7. An electroluminescent screen adapted to emit white light upon excitation by an alternating electric field comprising a pair of opposed electrodes spaced by a layer of finely-divided phosphor particles in an insulating medium, said layer consisting essentially of a mixture of 30 to 70 weight percent of a blue-emitting phosphor having the composition $0.91\text{ZnS} \cdot 0.09\text{ZnSe:Cu}(0.25):\text{I}$; and 70 to 30 weight percent of a yellow-emitting phosphor having the composition $0.65\text{ZnS} \cdot 0.35\text{ZnSe:Cu}(0.25):\text{Br:Mg}(1.2)$.

8. An electroluminescent screen adapted to emit white light upon excitation by a 420 cycle per second alternating electric field comprising a pair of opposed electrodes spaced by a layer of phosphor particles in a solid insulating binder, said layer consisting essentially of a mixture of 30 to 70 weight percent of a blue-emitting phosphor having the composition $$a\text{ZnS} \cdot b\text{ZnSe:Cu}(m):\text{I}$$

wherein
$a = 0.85$ to $1.0$ mol
$b = 0.15$ to $0.0$ mol
$a + b = 1.0$ mol
$m = 0.15$ to $0.35$ weight percent and 70 to 30 weight percent a yellow-emitting phosphor having the composition $$c\text{ZnS} \cdot d\text{ZnSe:Cu}(u):\text{Br:Mg}(p)$$

wherein
$c = 0.44$ to $0.78$ mol
$d = 0.56$ to $0.22$ mol
$c + d = 1.0$ mol
$u = 0.15$ to $0.35$ weight percent
$p = 0.5$ to $3.0$ weight percent.

9. The electroluminescent screen of claim 8 wherein said layer consists essentially of a mixture of 30 to 70 weight percent of a blue-emitting phosphor having the composition $0.91\text{ZnS} \cdot 0.09\text{ZnSe:Cu}(0.25):\text{I}$; and 70 to 30 weight percent of a yellow-emitting phosphor having the composition $0.65\text{ZnS} \cdot 0.35\text{ZnSe:Cu}(0.25):\text{Br:Mg}(12)$.

10. The electroluminescent screen of claim 9 wherein the weight percents of the blue and the yellow phosphors are about 35.7 and 64.3 respectively.

11. The eelctroluminescent screen of claim 9 wherein the weight percents of the blue and the yellow phosphors are about 37.5 and 62.5 respectively.

12. The electroluminescent screen of claim 9 wherein the weight percents of the blue and the yellow phosphors are about 40.0 and 60.0 respectively.

13. The electroluminescent screen of claim 9 wherein the weight percents of the blue and the yellow phosphors are about 45.0 and 55.0 respectively.

14. The electroluminescent screen of claim 9 wherein the weight percents of the blue and the yellow phosphors are about 50.0 and 50.0 respectively.

15. The electroluminescent screen of claim 9 wherein the weight percents of the blue and the yellow phosphors are about 60.0 and 40.0 respectively.

References Cited in the file of this patent
UNITED STATES PATENTS

| | | |
|---|---|---|
| 2,925,532 | Larach | Feb. 16, 1960 |
| 2,965,784 | Hoffman | Dec. 20, 1960 |